No. 786,992.

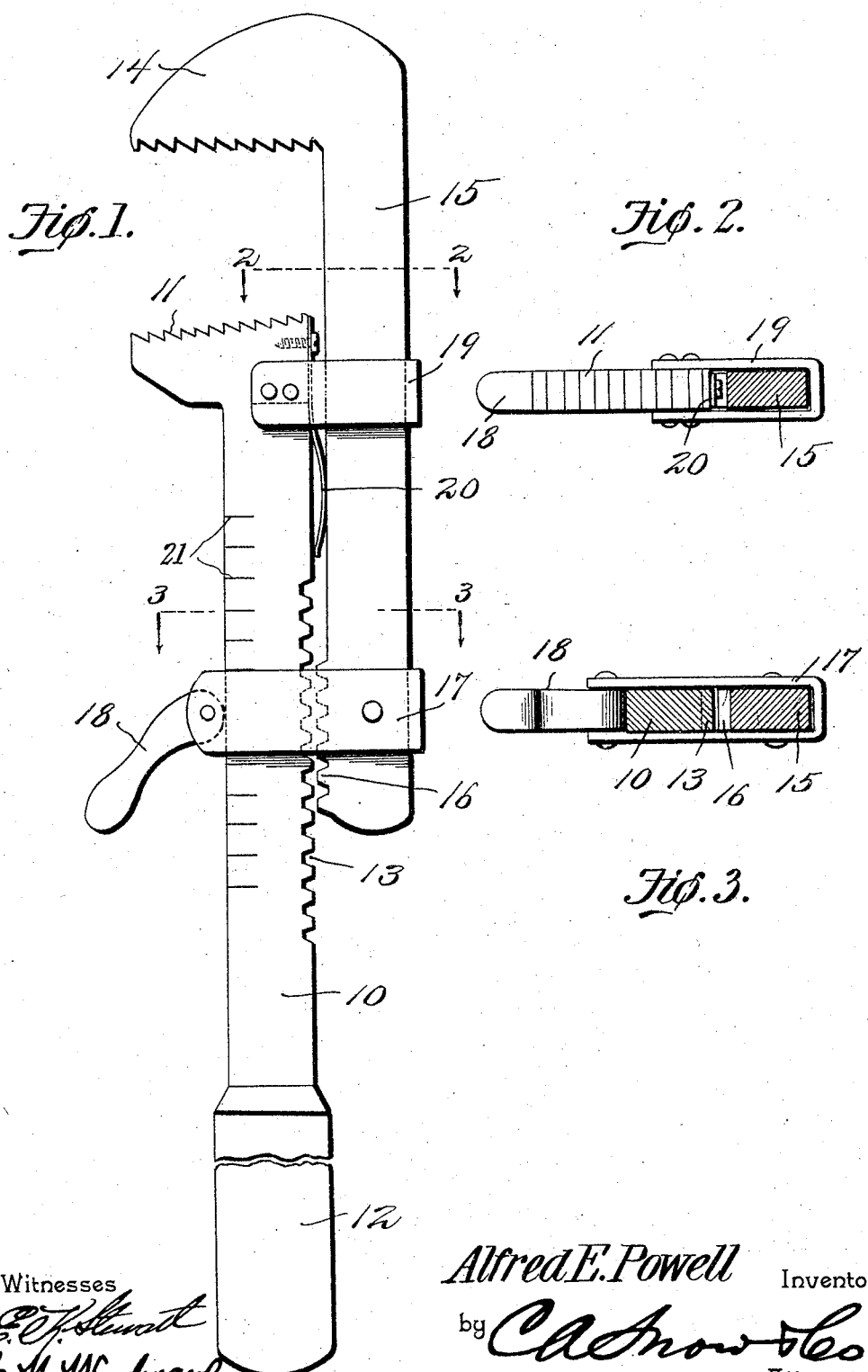

Patented April 11, 1905.

UNITED STATES PATENT OFFICE.

ALFRED E. POWELL, OF PEN ARGYL, PENNSYLVANIA, ASSIGNOR OF ONE-HALF TO MONROE WISE, OF PEN ARGYL, PENNSYLVANIA.

PIPE-WRENCH.

SPECIFICATION forming part of Letters Patent No. 786,992, dated April 11, 1905.

Application filed May 17, 1904. Serial No. 208,432.

*To all whom it may concern:*

Be it known that I, ALFRED E. POWELL, a citizen of the United States, residing at Pen Argyl, in the county of Northampton and State of Pennsylvania, have invented a new and useful Pipe-Wrench, of which the following is a specification.

This invention relates to pipe-wrenches, and has for its object to improve the construction and produce an implement of this character inexpensive to manufacture, strong and durable, and which may be readily applied to any size of pipe within the range of the movement of its jaws.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a side elevation. Fig. 2 is a transverse section on the line 2 2 of Fig. 1 looking toward the jaw end of the implement, and Fig. 3 is a sectional view on the same line looking toward the handle end of the same.

The improved implement comprises a stock, preferably rectangular in transverse section and having at one end a pipe-engaging jaw 11 and extended into a handle 12 at the other end and with spaced teeth 13 in one edge of the stock between said handle and jaw. The opposing jaw 14 is provided with a bar 15, extending parallel to the stock 10 and provided with spaced teeth 16 for interlocking with the teeth 13 of the stock 10 when the two members 10 and 15 are closely engaged.

Connected to the free end of the bar 15 is a U-shaped clip 17, with its spaced legs extending upon opposite sides of the stock 10 and in advance of the same and supporting a clamping cam member 18 between them for bearing upon the adjacent face of the stock and serving to firmly clamp the members 10 and 15 and cause the teeth 13 16 to interlock.

A U-shaped guide-clip 19 is connected by its legs to the nether jaw 11 or to the stock 10 adjacent to the jaw and engaging the bar 15 by its looped end, so that the bar is slidable through the guide-clip.

A spring 20 is disposed between the bar 15 and stock 10 to keep them yieldably spaced apart to an extent sufficient to permit the oppositely-disposed teeth 13 16 to pass each other when the cam member is released and the bar adjusted longitudinally of the stock. By this arrangement the spring is housed between the stock 10, the shank 15, and the guide 19 and is thereby not liable to become broken.

The stock 10 is provided with gage-lines 21 in inches and fractions of inches to facilitate the setting of the movable jaw.

By this simply-constructed implement when the same is to be applied the clamping-cam 18 is released and the bar 15, with its attached clip 17, adjusted until the clip is placed opposite the gage-mark 21, corresponding to the pipe with which the jaws are to be engaged. The cam member 18 is then thrown into engagement with the stock 10 and the bar 15 compressed against the stock and the teeth 13 16 interlocked to enable the jaw members to closely engage the pipe, as will be obvious. The implement may thus be adapted to any size of pipe within the range of the movable jaw member 14.

By reason of the cam 18 being carried by the guide 17, which is in turn carried by the shank of the movable jaw, the cam 18 serves as a handle for convenience in shifting the movable jaw upon the stock 10, and as the guide 17 coöperates with the scale 21 the movable jaw may be conveniently set to any predetermined position.

Having thus described the invention, what is claimed is—

A wrench comprising a stock having a fixed jaw, the back of the stock being provided with an intermediate toothed portion and a smooth portion between the teeth and the jaw extremity of the stock, a slotted guide carried by the stock and projected at the smooth rear edge thereof, a movable jaw having a shank working through the slotted guide and provided with a toothed portion coöperating with the toothed portion of the stock, a bowed spring located between the smooth back of the stock and the shank in frictional engagement with the latter and carried by the former, a substantially U-shaped guide carried by the inner end portion of the shank and slidably embracing the stock, and a handled cam pivotally carried by said guide in frictional engagement with the front of the stock.

In testimony that I claim the foregoing as my own I have hereto affixed my signature in the presence of two witnesses.

ALFRED E. POWELL.

Witnesses:
CORALENA MEARS,
WEBSTER F. KRESGE.